United States Patent
Carter et al.

(10) Patent No.: US 10,592,603 B2
(45) Date of Patent: Mar. 17, 2020

(54) IDENTIFYING LOGIC PROBLEMS IN TEXT USING A STATISTICAL APPROACH AND NATURAL LANGUAGE PROCESSING

(71) Applicant: International Business Machines Corporation, Armonk, NY (US)

(72) Inventors: Brett L. Carter, Liberty Lake, WA (US); Kameron A. Cole, Miami Beach, FL (US); Vijai Gandikota, Austin, TX (US); Jimmy M. Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 15/014,698

(22) Filed: Feb. 3, 2016

(65) Prior Publication Data
US 2017/0220554 A1  Aug. 3, 2017

(51) Int. Cl.
*G06F 17/27* (2006.01)
*G06F 8/30* (2018.01)

(52) U.S. Cl.
CPC ............ *G06F 17/277* (2013.01); *G06F 8/313* (2013.01)

(58) Field of Classification Search
None
See application file for complete search history.

(56) References Cited

U.S. PATENT DOCUMENTS

| | | | |
|---|---|---|---|
| 5,835,888 A | 11/1998 | Kanevsky et al. | |
| 6,871,174 B1 * | 3/2005 | Dolan | G06F 17/30684 704/9 |
| 7,730,085 B2 | 6/2010 | Hassan et al. | |
| 8,001,144 B2 | 8/2011 | Novak | |
| 8,602,793 B1 | 12/2013 | Sniedzins | |
| 9,606,990 B2 * | 3/2017 | Allen | G06F 17/289 |
| 9,648,167 B2 | 5/2017 | Riahi et al. | |

(Continued)

OTHER PUBLICATIONS

List of IBM Patents or Patent Applications Treated as Related (Appendix P), 2 pages.

(Continued)

*Primary Examiner* — Qian Yang
(74) *Attorney, Agent, or Firm* — Stephen R. Tkacs; Stephen J. Walder, Jr.; Diana R. Gerhardt

(57) ABSTRACT

A mechanism is provided in a data processing system for identifying a logic problem to be solved in an input text. A parser executing in the data processing system parses the input text to identify entities in the input text. A statistical analysis component executing in the data processing system determines statistical relationships between pairs of entities in the input text to form a set of statistical relationships. A logic problem detection engine executing in the data processing system determines whether the set of statistical relationships includes a high density of standard relationships and one or more outlier relationships. Responsive to determining that the set of statistical relationships includes a high density of standard relationships and one or more outlier relationships, the mechanism presents an indication that the input text includes a logic problem to a user.

21 Claims, 15 Drawing Sheets

(56) References Cited

U.S. PATENT DOCUMENTS

| | | |
|---|---|---|
| 2005/0044495 A1 | 2/2005 | Lee et al. |
| 2009/0287678 A1 | 11/2009 | Brown et al. |
| 2011/0066587 A1 | 3/2011 | Ferrucci et al. |
| 2011/0125734 A1 | 5/2011 | Duboue et al. |
| 2011/0251984 A1 | 10/2011 | Nie et al. |
| 2012/0078636 A1 | 3/2012 | Ferrucci et al. |
| 2012/0078826 A1* | 3/2012 | Ferrucci ............... G06N 7/005 706/12 |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |
| 2014/0314225 A1 | 10/2014 | Riahi et al. |
| 2015/0019207 A1 | 1/2015 | Dou et al. |
| 2015/0169537 A1 | 6/2015 | Corston et al. |
| 2016/0147871 A1* | 5/2016 | Kalyanpur ........ G06F 17/2705 707/728 |
| 2016/0378853 A1 | 12/2016 | Mohammad |
| 2017/0039188 A1* | 2/2017 | Allen ..................... G06F 8/73 |
| 2017/0060831 A1* | 3/2017 | Smythe ............. G06F 17/271 |
| 2017/0220554 A1 | 8/2017 | Carter et al. |

OTHER PUBLICATIONS

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Milicevic, Aleksandar et al., "PUZZLER: An Automated Logic Puzzle Solver", Massachusetts Institute of Technology (MIT), Feb. 2012, 22 pages.

Schwitter, Rolf, "Reconstructing Hard Problems in a Human-Readable and Machine-Processable Way", 10th Pacific Rim International Conference on Artificial Intelligence (PRICAI 2008), Dec. 15-19, 2008, 7 pages.

Wintein, Stefan, "A Framework for Riddles about Truth that do not involve Self-Reference", Studia Logica, vol. 98, Issue: 3, Chapter 2, Aug. 2011, pp. 39-69.

Yuan, Michael J., "Watson and healthcare, How natural language processing and semantic search could revolutionize clinical decision support", IBM developerWorks, IBM Corporation, Apr. 12, 2011, 14 pages.

* cited by examiner

Filter: [        ]  [Clear]

▲ Part of Speech ²
▲ Phrase Constituent ²
▼ Named entity ²
   ☐ Person
   ☐ Location
   ☐ Organization
▼ Terms of Interest
   ☐ Logic Puzzles
   ☐ Experiencer
   ☐ Possession
   ☐ Theme
   ☐ Owner
   ☐ Attribute Columns Show: [Noun ▼]   Filter Columns: [        ] [Clear]

Rows = Person
Columns = Attribute

Correlation Amount: Low [▓▓▓] High

| Rows:Person | Columns:Attribute |
|---|---|
| Smith | baker |
| Smith | tailor |
| Smith | son |
| Smith | smith |
| Smith | carpenter |
| Smith, Baker | baker |
| Smith, Baker | tailor |
| Smith, Baker | son |
| Smith, Baker | smith |
| Smith, Baker | carpenter |

Add Entry to Dictionary dict-EN-NA-entity

Enter the details for the new dict-EN-NA-entity entry

Normal form with alternate surface forms and constraints for this dict-EN-NA-entity:

| Surface Form | Alone | Begin | Mid | End | |
|---|---|---|---|---|---|
| goat | ☑ | ☑ | ☐ | ☑ | Add Surface Form |
| goats | ☑ | ☑ | ☐ | ☑ | Generate Inflections |
| | | | | | Include Simplified MWU |
| | | | | | Set Normal Form |
| | | | | | Remove |

Part of Speech: Noun ▼

☐ sentient order: herbivore class: mammal

☑ animate

Add    Cancel    Close

IDENTIFYING LOGIC PROBLEMS IN TEXT USING A STATISTICAL APPROACH AND NATURAL LANGUAGE PROCESSING

BACKGROUND

The present application relates generally to an improved data processing apparatus and method and more specifically to mechanisms for solving logic problems using a statistical approach and natural language processing.

A logic puzzle is a puzzle in which the answer can be deduced from a given set of premises. An induction puzzle is a type of logic puzzle which is solved using inductive logic. Usually, the puzzle's scenario will involve several participants with reasoning capability in which each participant has specific information about each of the other participants, but not about himself or herself. A lateral thinking puzzle is a type of puzzle that involves critical and logical thinking. Lateral thinking puzzles are also known as situational riddles or brain teasers.

Natural language processing (NLP) is a field of computer science, artificial intelligence, and computational linguistics concerned with the interactions between computers and human (natural) languages. As such, NLP is related to the area of human-computer interaction. Many challenges in NLP involve natural language understanding, that is, enabling computers to derive meaning from human or natural language input, and others involve natural language generation.

SUMMARY

In one illustrative embodiment, a method, in a data processing system, is provided for identifying a logic problem to be solved in an input text. The method comprises parsing, by a parser executing in the data processing system, the input text to identify entities in the input text. The method further comprises determining, by a statistical analysis component executing in the data processing system, statistical relationships between pairs of entities in the input text to form a set of statistical relationships. The method further comprises determining, by a logic problem detection engine executing in the data processing system, whether the set of statistical relationships includes a high density of standard relationships and one or more outlier relationships. The method further comprises presenting an indication that the input text includes a logic problem to a user responsive to determining that the set of statistical relationships includes a high density of standard relationships and one or more outlier relationships.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 depicts an example screen of display depicting a ranked list of hypotheses in accordance with an illustrative embodiment;

FIG. 9 depicts an example screen of display for a user interface for adding lexical information in accordance with an illustrative embodiment;

FIG. 11 depicts example screens of display for deepening linguistic output in accordance with an illustrative embodiment;

FIG. 13 depicts an example screen of display for object-oriented programming relationships in accordance with an illustrative embodiment;

DETAILED DESCRIPTION

Figure 1:
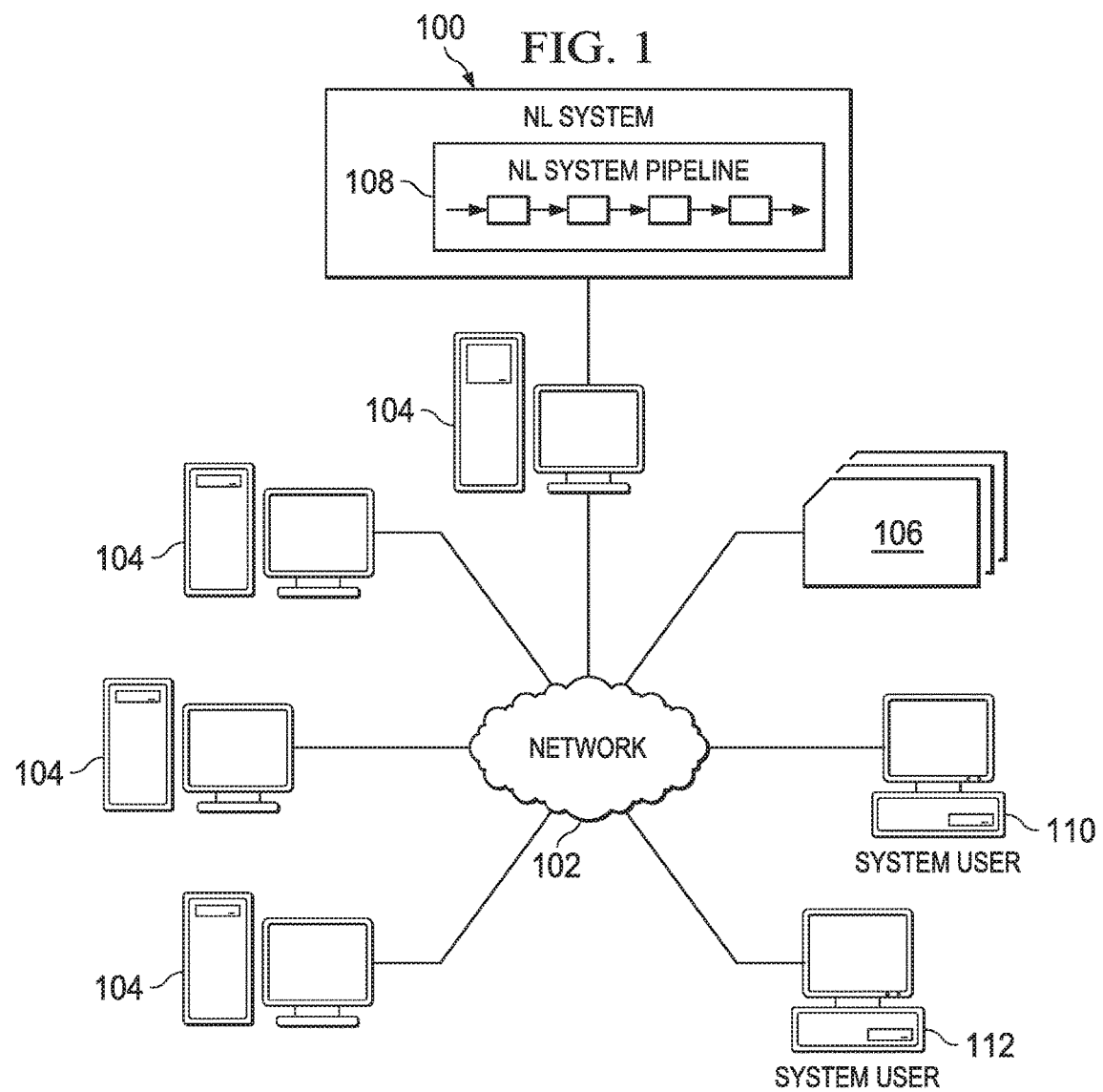
FIG. 1 depicts a schematic diagram of one illustrative embodiment of a natural language system in a computer network.

The illustrative embodiments provide a mechanism for identifying logic problems in natural language (NL) text using a statistical approach and natural language processing (NLP). The illustrative embodiments provide a parser for parsing natural language text to perform shallow parsing and deep linguistic parsing and statistical analysis to determine correlations between entities and concepts in the text. The mechanism then determines whether the density of standard correlation values and the presence of one or more extremely high or extremely or extremely low correlation values, which is consistent with a logic problem being present in the text. The mechanism identifies an explicit question, one or more missing facts, and/or a statistical anomaly present in the text and outputs identification of a logic problem in the text.

The illustrative embodiments provide a mechanism for solving logic problems in natural language (NL) text using a statistical approach and natural language processing (NLP). The mechanism receives an NL text that includes a logic problem. The illustrative embodiments provide a parser for parsing natural language text to perform shallow parsing and deep linguistic parsing. The mechanism performs lexical processing to add lexical information, thus providing implicit knowledge not given in the text. The mechanism determines theta roles, which supply further logical relationships and additional constraints on the entities. The mechanism also deepens the linguistic output by determining object oriented programming (OOP) relationships between entities. The mechanism uses statistical analysis to determine correlations between entities and concepts in the text and determines whether each correlation and statistical anomaly fits as a solution to the logic problem. If the mechanism determines a solution, or a plurality of solutions, then the mechanism presents the solution to the logic problem as output. If the mechanism determines that no solution exists because a crucial fact is missing or a statistical anomaly renders a solution impossible, then the mechanism returns an indication that no solution is found.

The illustrative embodiments apply to explicit logic puzzles for fun or entertainment, as well as potential applications in medicine, finance, technology, law enforcement, etc. A logic puzzle is a contrivance in that it does not take from the real world. The conclusion of a logic puzzle is preconceived and forgone; thus, the solution is simply a matter of discovering the intended contrived pattern. In other words, one does not "solve" a logic puzzle in the same way one does not solve a crossword puzzle: the solution is already done and one must uncover or discover the existing solution.

In contrast, a real-world police report or medical intake record, for example, has no forgone conclusion. In fact, there may not exist a possible conclusion or solution at all in the real world. Thus, as used herein, a logic puzzle is a puzzle having a preconceived and forgone solution, while a logic problem is a set of facts, relationships, or statistical pair groupings that match the pattern of a logic puzzle. In other words, as used in this description, a logic problem matches the pattern of a logic puzzle but does not have a preconceived or forgone solution.

The mechanisms of the illustrative embodiments determine whether a given real-world text matches the structural requirements of a logic puzzle. The mechanisms then derive possible solutions and rank their statistical probability. Alternatively, the mechanisms determine that no such solution is at all discoverable, i.e., that the text is logically flawed.

In previous practice, logic puzzles are ostensibly solved by symbolic logic only. Of course, a priori world knowledge and systematic assumption are constantly, albeit unknowingly, applied. The illustrative embodiments may use logic and may use a priori knowledge and assumptions but do so explicitly. However, the mechanisms of the illustrative embodiments, unlike prior art solutions, add statistics as the foremost means for deriving the possible solutions. The examples described herein show various natural language texts containing logic puzzles. While the illustrative embodiments provide mechanisms that use a priori knowledge, assumptions, and statistics to solve logic puzzles, the illustrative embodiments are primarily concerned with solving real-world texts that match the discourse style of a logic puzzle. For a pure logic puzzle example, the mechanisms of the illustrative embodiments may be better or worse than prior art solutions at solving a given logic puzzle; however, for a real-world text, the mechanisms of the illustrative embodiments recognize the discourse style of a logic puzzle and use a prior knowledge, assumptions, and statistics to solve a problem in the text in a manner of which prior art logic puzzle solvers are not capable.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
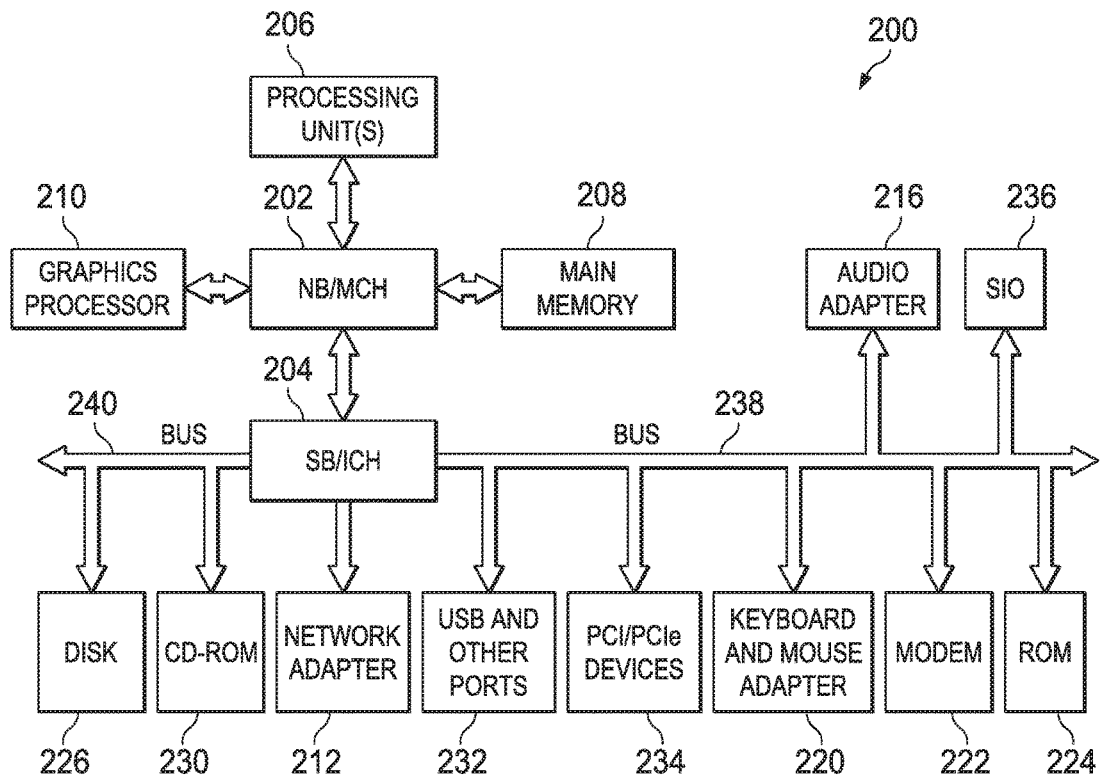
FIG. 2 is an example block diagram of a data processing system chip in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIGS. 1 and 2 are directed to describing an example Natural Language (NL) system methodology, and computer program product with which the mechanisms of the illustrative embodiments are implemented. As will be discussed in greater detail hereafter, the illustrative embodiments are integrated in, augment, and extend the functionality of these NL mechanisms with regard to detecting and solving logic problems using content mining.

Thus, it is important to first have an understanding of how natural language processing in an NL system is implemented before describing how the mechanisms of the illustrative embodiments are integrated in and augment such NL systems. It should be appreciated that the NL mechanisms described in FIGS. 1 and 2 are only examples and are not intended to state or imply any limitation with regard to the type of NL mechanisms with which the illustrative embodiments are implemented. Many modifications to the example NL system shown in FIGS. 1 and 2 may be implemented in various embodiments of the present invention without departing from the spirit and scope of the present invention.

As an overview, a Natural Language system (NL system) is an artificial intelligence application executing on data processing hardware that performs processing pertaining to a given subject-matter domain presented in natural language. The NL system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the NL system. The document may include any file, text, article, or source of data for use in the NL system. For example, an NL system accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

FIG. 1 depicts a schematic diagram of one illustrative embodiment of a Natural Language (NL) system 100 in a computer network 102. One example of NL processing is question/answer generation which is described in U.S. Patent Application Publication No. 2011/0125734, which is herein incorporated by reference in its entirety. NL system 100 analyzes natural language to generate solutions not possible with traditional deterministic systems. In some embodiments, NL system 100 is a probabilistic system built on concepts of Artificial Intelligence such as natural language processing, information retrieval, knowledge representation, automated reasoning, and machine learning.

The NL system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The NL system 100 and network 102 enables article summarization functionality for one or more system users via their respective computing devices 110-112. Other embodiments of the NL system 100 may be used with components, systems, sub-systems, and/or devices other than those that are depicted herein.

The NL system 100 is configured to implement an NL system pipeline 108 that receive inputs from various sources. For example, the NL system 100 receives input from the network 102, a corpus of electronic documents 106, system users, and/or other data and other possible sources of input. In one embodiment, some or all of the inputs to the NL system 100 are routed through the network 102. The various computing devices 104 on the network 102 include access points for content creators and system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the NL system 100 may operate in environments of any size, including local and global, e.g., the Internet.

The NL system 100 receives an input text from corpus 106, parses the text, performs lexical analysis, theta role analysis, object oriented programming (OOP) relationship analysis, and statistical analysis on text documents in the corpus of data 106. Based on the application of the queries to the corpus of data 106, the NL system 100 generates a set of discoveries, truth findings, or candidate solutions to logic problems in textual input. The NL system 100 may perform deep analysis, e.g., English Slot Grammar (ESG) and Predicate Argument Structure (PAS) builder, on the language of the input text and the language used in each of the portions of the corpus of data found during the application of the queries using a variety of reasoning algorithms (see, for example, McCord et al., "Deep Parsing in Watson," IBM J. Res. & Dev., vol. 56, no. 3/4, May/July 2012 for more information on deep analysis in IBM Watson™). There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the textual input. Other reasoning algorithms may look at temporal or spatial features in the language, while others may determine OOP relationships between entities.

In one embodiment, combinations of the software components or reasoning algorithms of NL system pipeline 108 form cognitive processing components to be used for recognizing and solving a text that matches the discourse style of a logic problem. A cognitive processing component is a software component that can perform a function for analysis and understanding of natural language documents or other unstructured content. In one embodiment, the cognitive processing components include a parser, a lexical analysis component, a theta role analysis component, an OOP relationship analysis component, and a statistical analysis component. The cognitive processing components will be described in further detail below.

In some illustrative embodiments, the NL system 100 may include components of the IBM Watson™ system available from International Business Machines Corporation of Armonk, N.Y., which is augmented with the mechanisms of the illustrative embodiments described hereafter. More particularly, the IBM Watson™ Developer Cloud provides cognitive services for processing unstructured content for understanding and analysis. NL system 100 performs deep analysis on the language of an input text and other content in the corpus of data using a variety of reasoning algorithms. More information about the IBM Watson™ system may be obtained, for example, from the IBM Corporation website, IBM Redbooks, and the like. For example, information about the IBM Watson™ system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In accordance with an illustrative embodiment, a natural language (NL) processing system, which may be NL system 100 in one embodiment or may run on another one of servers 104, ingests an textual input from corpus 106 leveraging knowledge gleaned from cognitive processing components for understanding, analyzing, detecting, and solving logic problems. The NL processing system deconstructs the semantic and cognitive processing related to the input text using various cognitive processing components and related offerings. The NL system performs deep semantic parsing and detects entities and relationships within the input text. Different types of entities (e.g., people, animals, locations, dates, or times) may receive further treatments with the cognitive processing components. Operation of the NL processing system for solving logic problems is described in further detail below with reference to FIG. 3.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which implements an NL system 100 and NL system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
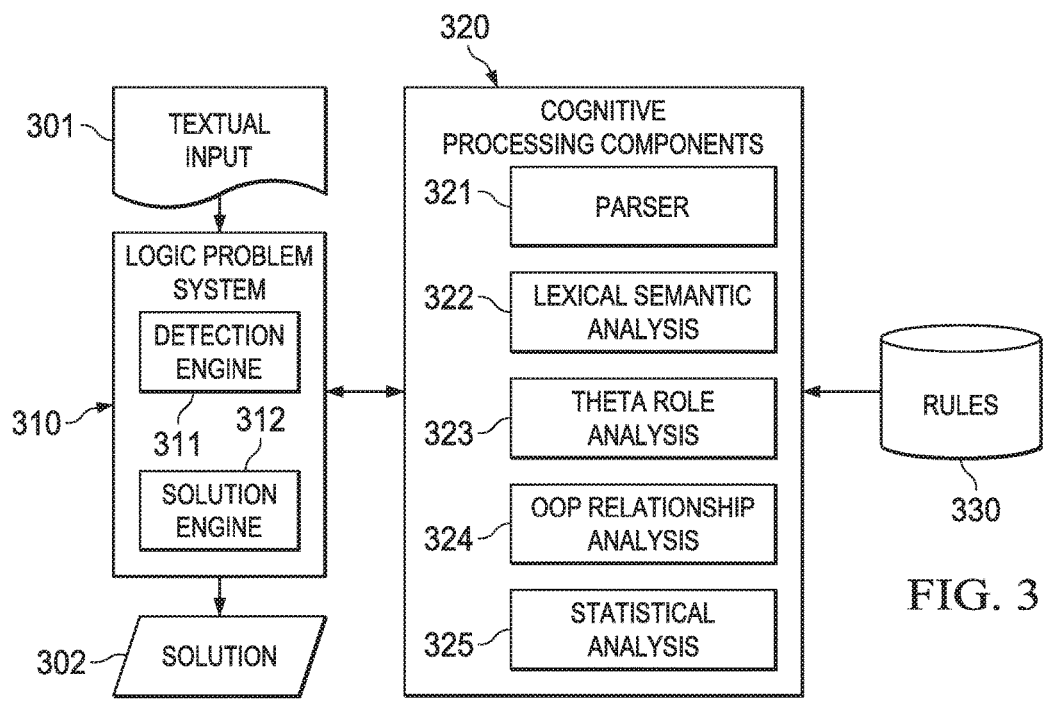
FIG. 3 is a block diagram of system for solving logic puzzles using natural language processing in accordance with an illustrative embodiment.

FIG. 3 is a block diagram of system for solving logic problems using natural language processing in accordance with an illustrative embodiment. Logic problem system 310 includes logic problem detection engine 311 and solution engine 312. Logic problem system 310 receives textual input 301, which may be a document to be ingested into a corpus, a problem entered by a user through a user interface such as a Web interface, a posting to a social media site or microblogging system, or any other unstructured content. Detection engine 311 detects the presence of a logic problem in textual input 301 and solution engine 312 generates solution 302. In one embodiment, solution engine 312 generates a plurality of candidate solutions (hypotheses) 302 ranked by confidence score.

In one embodiment, detection engine 311 analyzes textual input 301 to determine whether the text input includes a logic problem. A logic problem is typically a story problem written in natural language. Like any puzzle, a logic puzzle or problem has pieces that fit together but leaves gaps for other pieces. The pieces that are "easy" are the facts presented as a set of "clues." To fill in the missing pieces requires logic. The clues, when viewed as a whole, show a number of relationships between some of the entities and concepts. These relationships establish a pattern, which, if applied to the other facts, should lead to establishing relationships between all of the entities and concepts. In addition to the clues, there must also be a question, a missing fact, or an anomaly: the particular problem to be solved.

More specifically, logic puzzles involve a subset of formal logic, namely deductive and inductive reasoning and abductive inference. This means that some truths are stated (i.e., the clues) and other truths are unstated but must be derived through deduction or abductive reasoning. What makes a given text a logic puzzle is that certain facts are "missing." The absence of certain facts is implied by the discrete logical framework, which is incomplete without these facts. One of the unstated, or missing, truths may be the answer to the question posed in the puzzle. For this reason, human language understanding is critical; however, more critical is the ability to understand relationships described directly or implied.

If one understands the explicit and implicit truths in a piece of text, one can create a matrix from the relationships. In a strong sense, this is a kind of transformation of the semantics of human language into a mathematical model. This transformation allows for the application of any mathematical operations. This is, in fact, the meaning of "text" or "content" analytics—applying statistical methods to quantifiable elements extracted from natural language text.

Content mining is the extraction of data from unstructured information presented in various forms of documents and the transformation of that data into useful information and knowledge by the application of linguistic models. Once extracted, these entities can be inputs to mathematical (e.g., statistical) models, hence the word "analytics." Any descriptive statistical formulas can be applied to the entities to discover the statistical relationships between them either statically or as a function of time. The statistical relationships may include relative density of occurrence, correlation, and deviation. A visual application presents these entities and their relationships in a graphical or tabular two-dimensional view for easier human analysis and insight discovery.

Consider the following simple example:
"There is a bird, a rabbit, and an eel. There are three habitats: a nest, a hutch, and a coral reef. The bird lives in the nest. The rabbit lives in the hutch."

In this example, the missing truth is in which habitat the eel lives. Now consider the following more complex example:

"A patient was admitted to the emergency room wearing a pirate costume. The patient had two thin lateral wounds, one on the stomach and one on the back. The wounds exhibited mild bleeding commingled with subcutaneous fat."

In this case, solving the logic problem involves identifying the relationship between pirates and swords, the relationship of the two matching wounds, and the symptom of bleeding being commingled with subcutaneous fat. The unstated truths include these relationships, and the solution to the problem is identifying that the patient is likely to have been impaled by a sword.

If the qualitative truths contained in the language are converted to quantitative truths that can be counted and fed into a statistical formula, the unstated truths will emerge statistically. In one embodiment, the mechanisms use the ratio of densities formula used in Watson Content Analytics (WCA) by International Business Machines. The ratio of densities formula is capable of finding statistical anomalies. The ratio of densities formula is as follows:

$$\text{ratio of densities} = \frac{\#(A \cap B)/\#A}{\#B/\#D} = \frac{\#(A \cap B)/\#D}{(\#A/\#D)(\#B/\#D)}$$

The premise is that the two variables, A and B, should be evenly densely populated throughout a data corpus or domain, D. Therefore, when determining the correlation of entity A to entity B, A is the first entity or concept, B is a second entity or concept, and D may be the domain of all entities and concepts. If the total corpus is limited to all things B, the A variable will possibly have a different density within B than it does within the complete data set. In that case, the density of A within B is statistically different than its density within the full data corpus.

For example, in a set of medical records (D) penicillin (A) will be common—it will occur in all patient records where penicillin was administered at treatment. If B is the subset of patients who died while in the hospital, the density of penicillin would be anomalous—it should not occur in any deaths. If it does, it could be attributable to negligent administration of penicillin to a patient with an allergy to that drug.

The illustrative embodiments use the above formula to discover logical anomalies in text that describe a discrete set of relationships. Absence of an anomaly is an indication that data falls within predicted bounds. An anomaly indicates something unusual or abnormal in the data. It is up to the end user to interpret whether an anomaly needs a solution or whether to investigate the cause of the anomaly.

A logical anomaly can actually be presented as a high ratio of densities value. If two things are always found in the same context together, they will have a consistent ratio of densities score, which may be high. Instead of an anomaly, this indicates a truth. Together, all of these truths form the statistical denominator for the ratio of densities. Now, when a thing occurs only once, or randomly, with a single member of some other statistical pair, then that relationship scores high.

Consider the following example. In a medical report, it may have the pair suture->incision evenly distributed. That represents a fact. But in one case, the pair tape->incision appears. The pair suture->incision has a score that is higher, e.g., 26. That indicates it is a common pair, i.e., "a fact." The pair tape->incision, in contrast, may have a density score of 397, for example, indicating that it is an anomaly compared to suture->incision. The problem to solve is why did they use tape in this one incision?

Logic problem system 310 communicates with and uses cognitive processing components 320 to help individual processing and collective analyses. In the depicted example, cognitive processing components 320 include parser 321, lexical analysis component 322, theta role analysis component 323, OOP relationship analysis component 324, and statistical analysis component 325. Cognitive processing components 320 may include more or fewer components within the spirit and scope of the illustrate embodiments. In one example embodiment, some or all of cognitive processing components 320 may be included in the IBM Watson™ Services provided through the IBM Watson™ Developer Cloud. In one embodiment, cognitive processing components 320 provide application programming interfaces (APIs) to allow access by logic problem system 310.

Cognitive processing components 320 operate by applying rules 330 to text or portions of text. These rules 330 may include parser rules, lexical analysis rules, theta role analysis rules, OOP relationship rules, and the like. Cognitive processing components 320 apply combinations of rules 330 to perform the desired functions of deep linguistic parsing, lexical analysis, theta role analysis, and OOP relationship analysis.

Parser 321 performs shallow parsing and deep linguistic parsing on textual input 301. Shallow parsing (also chunking, "light parsing") is an analysis of a sentence that identifies the constituents (noun groups, verbs, verb groups, etc.), but does not specify their internal structure, nor their role in the main sentence. Deep linguistic parsing is a natural language processing framework that draws on theoretical and descriptive linguistics. It models language predominantly by way of theoretical syntactic/semantic theory.

Lexical semantic analysis component 322 adds lexical knowledge not given in textual input 301. Lexical semantics is a subfield of linguistic semantics. The units of analysis in lexical semantics are lexical units that include not only words but also sub-words or sub-units such as affixes and even compound words and phrases. Lexical units make up the catalogue of words in a language, the lexicon. Lexical semantic analysis component 322 looks at how the meaning of the lexical units correlates with the structure of the language or syntax. This is referred to as syntax-semantic interface. The study of lexical semantics looks at the classification and decomposition of lexical items, the differences and similarities in lexical semantic structure cross-linguistically, and the relationship of lexical meaning to sentence meaning and syntax.

Theta role analysis component 323 determines theta roles, which supply further logical relationships and additional constraints on the entities. In generative grammar, a theta role is the formal device for representing syntactic argument structure (the number and type of noun phrases) required syntactically by a particular verb. For example, the verb "put" requires three arguments (i.e., it is trivalent). The formal mechanism for implementing this requirement is based in theta roles. The verb "put" is said to assign three theta roles. This is coded in a theta grid associated with the lexical entry for the verb. The correspondence between the theta grid and the actual sentence is accomplished by means of a bijective filter on the grammar known as the Theta Criterion.

OOP relationship analysis component 324 deepens the linguistic output by determining object oriented programming (OOP) relationships between entities. In object oriented programming, objects can contain other objects in their instance variables; this is known as object composition. For example, an object in the Employee class might contain (point to) an object in the Address class, in addition to its own instance variables like "first_name" and "position." Object composition is used to represent "hasA" relationships: every employee has an address, so every Employee object has a place to store an Address object. Languages that support classes almost always support inheritance. This allows classes to be arranged in a hierarchy that represents "isA" relationships. For example, class Employee might inherit from class Person. OOP relationship analysis component 324 assigns OOP relationships, such as "hasA" and "isA" relationships, between entities in textual input 301.

Statistical analysis component 325 involves collecting and scrutinizing data samples in a set of data from which samples can be drawn. A sample, in statistics, is a representative selection drawn from a total population. Statistical analysis can be broken down into five discrete steps, as follows: describe the nature of the data to be analyzed; explore the relation of the data to the underlying population; create a model to summarize understanding of how the data relates to the underlying population; prove (or disprove) the validity of the model; and, employ predictive analytics to run scenarios that will help guide future actions.

An example of statistical analysis is the IBM Watson™ Tradeoff Analytics service available through the IBM Watson™ Services provided through the IBM Watson™ Developer Cloud. The IBM Watson™ Tradeoff Analytics service helps people make better choices when faced with multiple, often conflicting goals and alternatives. By using mathematical filtering techniques to identify the top options based on multiple criteria, the service can help decision makers explore the trade-offs between options when making complex decisions. The service combines smart visualization and analytical recommendations for easy and intuitive exploration of trade-offs. A user specifies objectives, preferences, and priorities; the service filters out less attractive options to encourage the user's exploration of the remaining optimal candidates. In this way, the service helps decision makers consider only the goals that matter most and only the best options to make a final, informed decision.

In one illustrative embodiment, logic problem system 310 uses cognitive processing components 320 and other reasoning algorithms, techniques, or software components to identify concepts and entities, establish relationships between concepts and entities, determine truths or facts, and discover unstated truths or facts. For example, logic problem system 310 may use parser 321 to identify people, animals, times, places, and the like in textual input 301. Logic problem system 310 may use lexical semantic analysis 322 to provide a level of intuitiveness to solving logic problems. Logic problem system 310 may use theta role analysis component 323 and OOP relationship analysis 324 to establish relationships between entities and concepts. Logic problem system 310 may use statistical analysis service 325 to determine statistical correlation values representing relationships between entities and to detect statistical anomalies.

Detection engine 311 analyzes textual input 301 to detect the presence of a logic problem. Detection engine 311 discovers entities, concepts, and relationships in textual input 301. In an example embodiment, detection engine 311 uses parser 321 to discover entities, concepts, and relationships within the syntax of textual input 301. Detection engine 311 also performs statistical analysis on textual input 301, using statistical analysis component 325, for example, to determine a statistical correlation value for each pair of entities or concepts. In an example embodiment, detection engine 311 uses analytics to determine statistical correlations, which represent relationships between entities. More particularly, detection engine 311 may use the ratio of densities formula described above to determine the statistical correlation values and discover logical anomalies in text that describe a discrete set of relationships.

Figure 4:
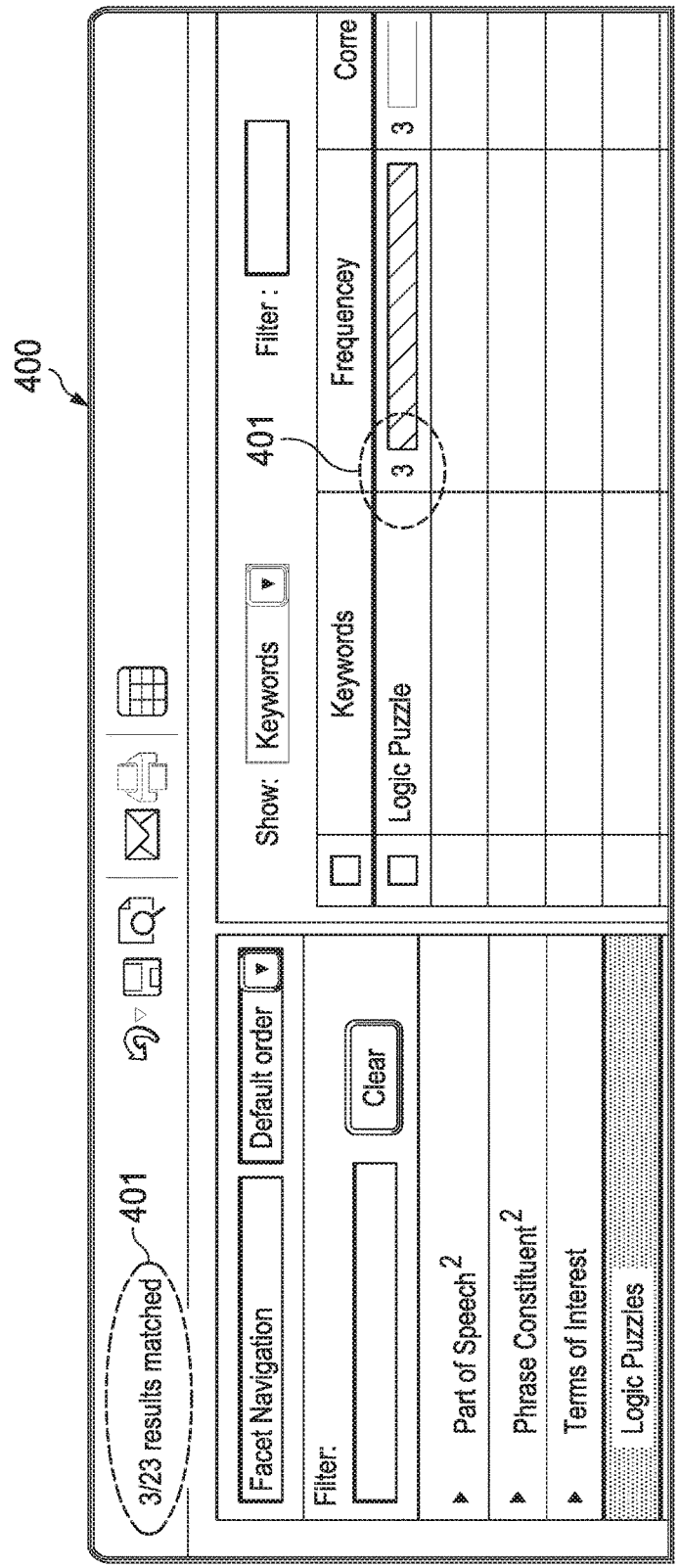
FIG. 4 depicts an example screen of display for searching for a specific keyword in text in accordance with an illustrative embodiment.

In one embodiment, detection engine 311 may detect the occurrence of the phrase "logic puzzle" in the text 301 using natural language classifier 321. FIG. 4 depicts an example screen of display for searching for a specific keyword in text in accordance with an illustrative embodiment. Screen of display 400 illustrates a search for the keyword "logic puzzle" in a text. Screen of display 400 shows search results 401 with frequency of occurrence 401 of keyword "logic puzzle."

Figure 5:
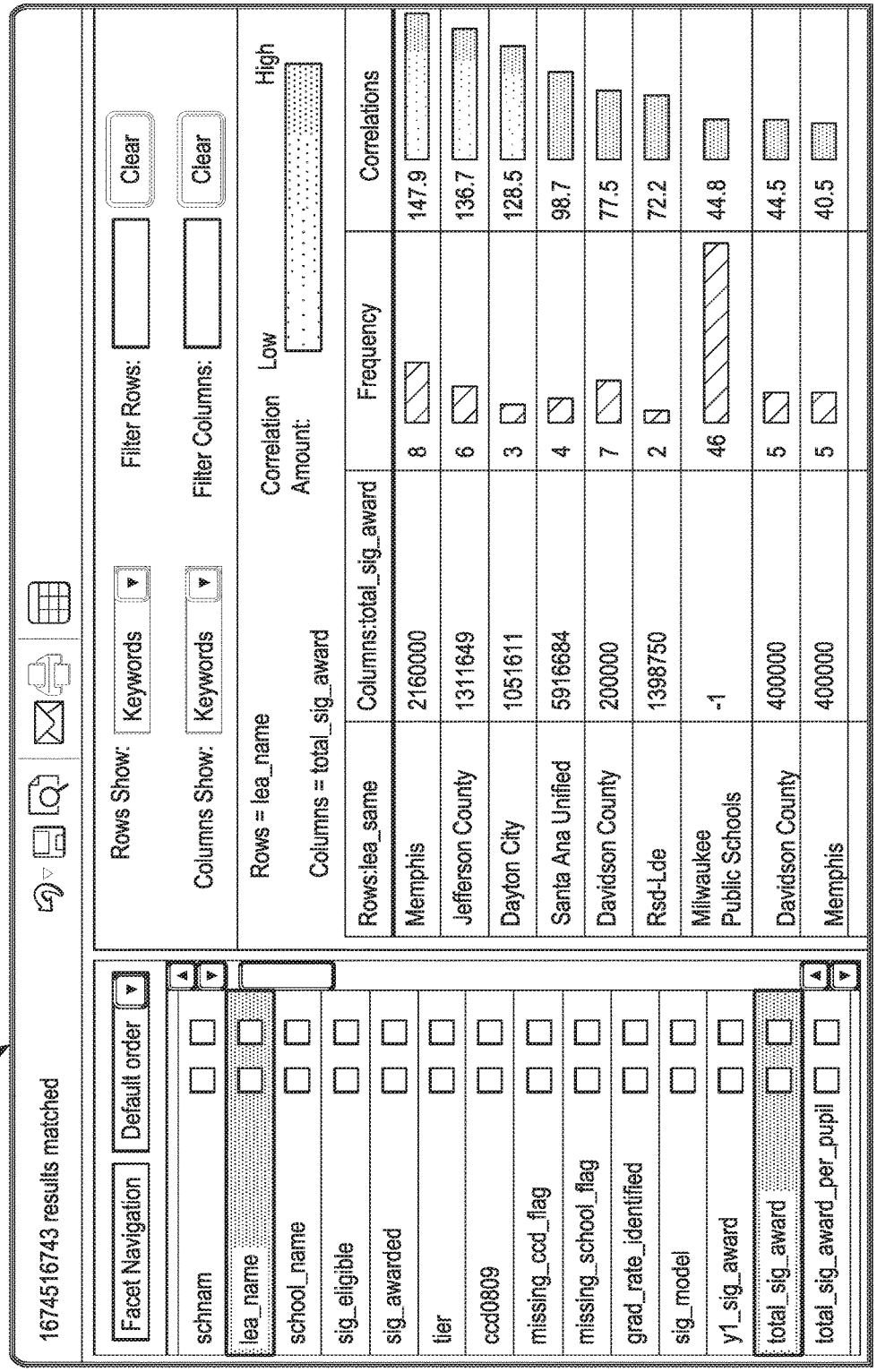
FIG. 5 depicts an example screen of display for statistical analysis in accordance with an illustrative embodiment.

In one example embodiment, detection engine 311 uses statistical analysis component 325 to detect statistical correlations (facts) and logical anomalies surfaced via statistics. FIG. 5 depicts an example screen of display for statistical analysis in accordance with an illustrative embodiment. Screen of display 500 shows correlation between local education agency (LEA) and award amounts. While it may not be evident to a non-expert, the top correlations had high scores because they represent a logical anomaly in the data corpus. By law, the award amounts are not supposed to be the same for all schools. In Memphis, of thirty-four awarded schools, eight schools had $21,160,000. All remaining awards from Memphis were for Tier 5 in amounts less than 400,000. They are Tier 1 with either model 1 or 4. All but one are high schools and only spend a small portion in the first year for all schools. In Jefferson County, of twenty-six awarded schools, six had the exact same amount. This also is the largest amount and only given to schools implementing models 1 and 5. All six turnaround models share the exact same dollar amount, regardless of schools size.

FIG. 5 represents an example of schools that received funding. This diagram points out that the correlation column shows an anomaly. In other words, the average layperson would not immediately recognize that there is an anomaly when presented with the facts of schools that receive funding, but when presented with this correlation view, it becomes much more apparent that there is a discrepancy.

Detection engine 311 analyzes the entities, relationships, truths, and missing facts to determine whether the text includes a logic problem. The superficial characteristics of a "logic puzzle" are: (1) a set of facts and relationships that are constant across the data; and, (2) one or more statistical outliers, within the context (statistically driven by) these facts. The statistical pairs and the outlier happen as a natural consequence of the ratio of densities. In one embodiment, detection engine 311 looks for statistical pair groupings that contain N standard correlation values and one or more extremely high correlations (logical anomaly) or extremely low correlations (missing piece, question to be solved). The total number of correlated pairs of facts, N, is determined by the total number of facts in the text. All combinations of pairs will receive some correlation coefficient. The value of 1.0 means no correlation. Detection engine 311 determines that textual input 301 contains a logic problem if textual input 301, along with supporting facts derived from the textual input, matches the pattern of statistical pair groupings indicative of a logic problem.

In one embodiment, detection engine 311 applies the ratio of densities formula described above to statistical correlation values in the input text 301 itself. That is, assuming a standard correlation value represents a fact, detection engine 311 applies the ratio of densities formula to determine a correlation values for the number of standard correlation values and the input text 301, where the domain is the overall corpus of documents or portions of text. Thus, detection engine 311 determines that a text with a high density of standard correlation values (facts) and one or more very high correlation values (anomaly) or very low correlation values (missing fact) may include a logic puzzle. Detection engine 311 may determine whether input text 301 has a high density of standard deviation values and determine whether a given statistical correlation value is very high or very low by comparing each value to one or more thresholds.

In one embodiment, detection engine 311 may also perform lexical processing, identify theta roles, and identify object oriented programming relationships between entities in the text. However, detection engine 311 may process many documents, such as case files in a legal docketing database, police reports, patient medical records, or the like. Detecting whether a logic problem may be present, particularly performing analytics on all pairs of entities in the text, can be a compute-intensive task. Therefore, in practice, one may make the design choice to perform logic problem detection on only the explicit facts of the text on a first pass and configuring solution engine 312 to perform the further compute-intensive tasks of performing lexical processing, identifying theta roles, and identifying object oriented programming relationships between entities in the text.

Solution engine 312 uses cognitive processing components 320 and other reasoning algorithms, techniques, or software components to generate one or more candidate solutions 302. In one embodiment, solution engine 312 uses parser component 321 to identify people, animals, times, places, and the like in textual input 301. Solution engine 312 uses lexical semantic analysis component 322 to add lexical knowledge not given in textual input 301, theta role analysis component 323 to determine theta roles, which supply further logical relationships and additional constraints on the entities, and OOP relationship analysis component 324 to deepen the linguistic output by determining object oriented programming (OOP) relationships between entities. Then, solution engine 312 uses statistical analysis component 325 to determine statistical correlations between pairs of entities and detect whether one or more statistical anomalies exist in textual input 301. Solution engine 312 determines whether each correlation and statistical anomaly fits as a hypothesis (candidate solution) to the logic problem. One or more of the hypotheses may be a solution to the logic problem or may combine to form a solution to the logic problem. Solution engine 312 then ranks the candidate solutions 302 and presents the ranked list as output. Solution engine 312 uses statistics and scoring to provide the solution to a detected logic problem.

Consider the following example:

"Smith, Baker, Carpenter, and Tailor each has a profession (smith, baker, carpenter, and tailor), but their professions are not shown by their names. Each of them has a son, but the sons also do not have professions shown by their names. If you know that: 1) no son has the same profession as his father, and 2) Baker has the same profession as Carpenter's son, and 3) Smith's son is a baker, then find the professions of the parents and sons."

In this example, the discrete system is that each father and each son has a direct correlation with one and only one profession. There are two constraints, which if stated statistically would be as follows: there is zero correlation between Baker and baker, and so on: and, there is zero correlation between a father's profession and the profession of his son. There are explicit correlations: there is 100% correlation between Smith's son and the profession baker; and, there is 100% correlation between the profession of Baker and that of Carpenter's son. There are implicit correlations: there is zero correlation between Carpenter's profession and Baker's profession.

NLP modeling can find entities in a generalized way, for example names and professions. From role-based linguistics, something like a profession can be "wrapped" in an implicit relationship, like an attribute. Using powerful yet general relationships from object-oriented programming (OOP), such as "isA" and "hasA" relationships, an attribute can be linked to an entity if such a relationship exists within the text. For example, the profession of baker can be shown as a relationship (isA:baker).

Figure 6:
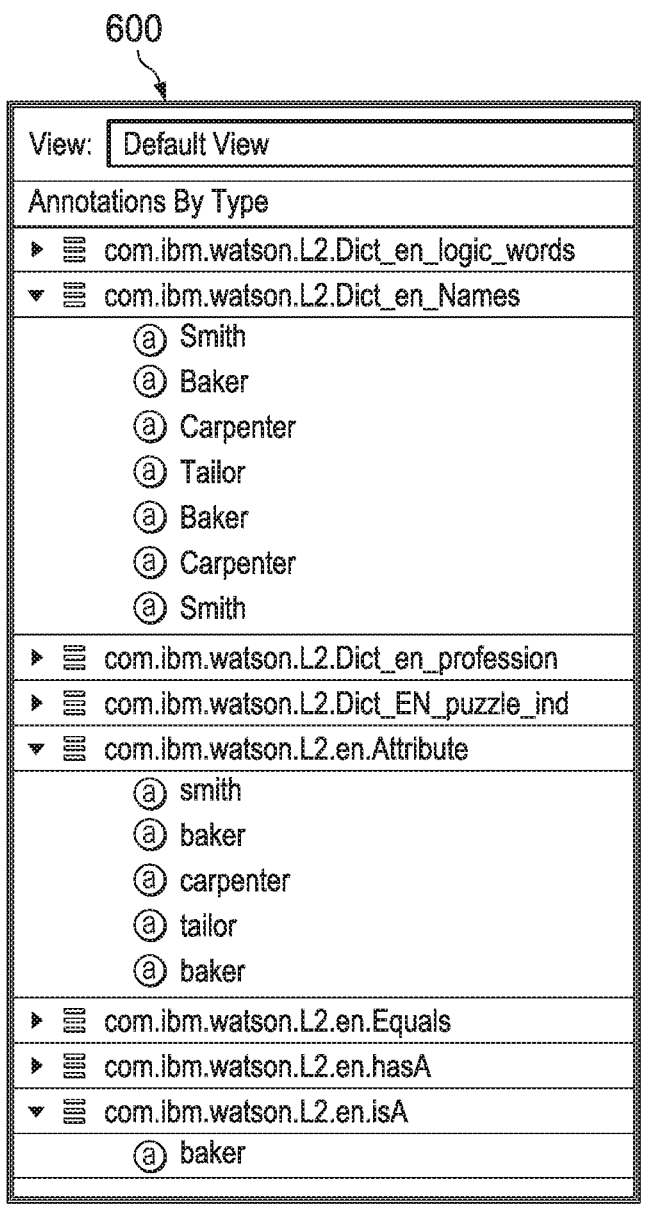
FIG. 6 depicts an example screen of display depicting entities, attributes, and relationships in accordance with an illustrative embodiment.

FIG. 6 depicts an example screen of display depicting entities, attributes, and relationships in accordance with an illustrative embodiment. Screen of display 600 shows name entities and profession attributes and "isA" relationships. FIG. 6 shows an underlying semantic engine that contains dictionaries, which are easily pre-populated. There is a representation of role-based semantics in terms of the "attributes" of entities. These could be built by machine learning as well. The unique aspect of the semantic engine is the use of "isA" and "hasA" relationships taken from object-oriented design. These tools are components of the solution on the Natural Language Processing (NLP) side of the engine, i.e., distinct from the statistical processing.

Figure 8:
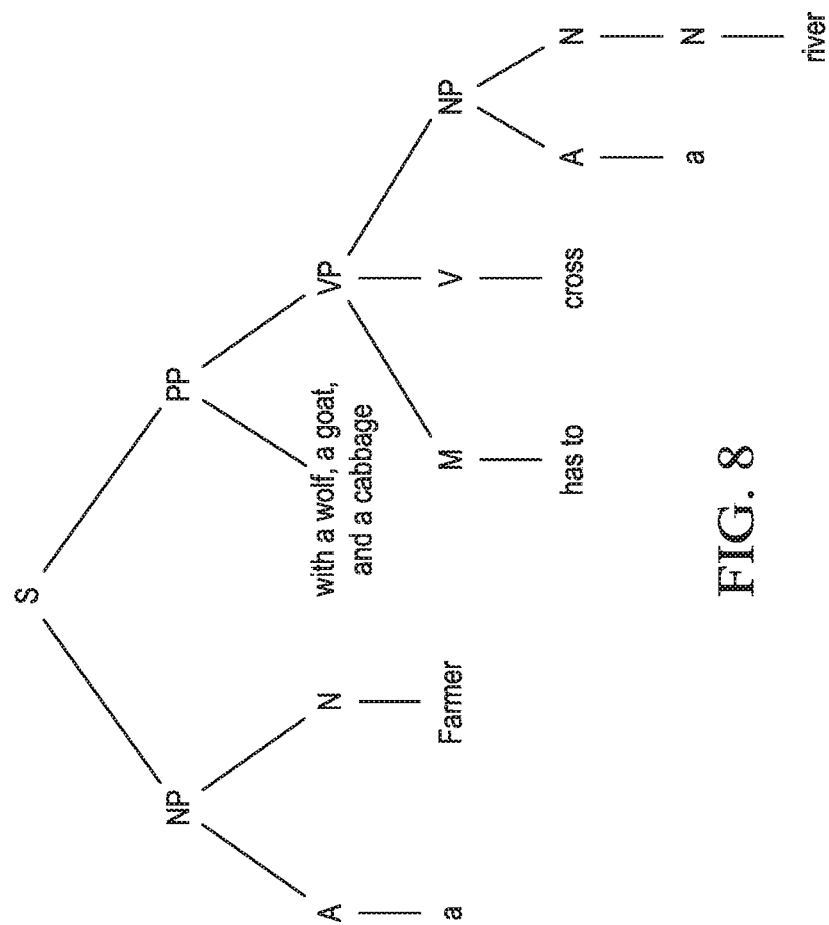
FIG. 8 illustrates deep parsing of text in a logic puzzle in accordance with an illustrative embodiment.

FIG. 7 depicts an example screen of display depicting a ranked list of hypotheses in accordance with an illustrative embodiment. FIG. 8 illustrates deep parsing of text in a logic problem in accordance with an illustrative embodiment. FIG. 8 indicates linguistic pre-processing of an input text, and FIG. 7 represents the surface application of the statistical formula. FIG. 7 shows the main user interface, which is essentially the statistical side of the solution engine 312. In other words, after all the entities are loaded into the system, the solution engine 312 analyzes the text both syntactically (e.g., FIG. 8) and statistically (e.g., FIG. 7) for derivable relationships. Solution engine 312 scores these relationships in terms of the statistical coefficient.

After applying cognitive services 320 and other reasoning algorithms, solution engine 312 ranks the possible solutions from most likely at the top to least likely. Screen of display 700 shows an early phase of a solution. As seen in display 700, all of the correlation values shown on the right are equal. In this case, all of the correlation values are 1, which is not the same as 0 (zero). Thus, all of these combinations are possible. Baker might be a baker, might be a smith, might have a son, etc. Note that the missing values are significant. They are not possibilities. Then, the matrix continues with hypotheses, using the combinations of Baker, Smith as the first "edge," and then showing the rest of the values for the second edge, and so on. Again, the hypotheses shown in display 700 all have a correlation value of 1, meaning they are possible. Therefore, it is likely that both Smith and Baker have a son, for example. Note also that the logic problem system does not know the answers. Rather, the logic problem system derives these possibilities from the text. For example, the logic problem system does not explicitly read that Baker has a son or that Smith has a son. Instead, the logic problem system derives these facts through statistics and/or semantics.

Consider the following example text:

"A farmer has to cross a river with a wolf, a goat, and a cabbage. He has a boat, but in the boat he can take just one thing. He cannot let the goat alone with the wolf or the goat with the cabbage. It is obvious why. What is the solution?"

As depicted in FIG. 8, deep parsing gives implicit logical rational structure to the facts of the problem. Deepening the linguistic output, the deep parser adds lexical information to create further logical implementations. Performing shallow parsing results in the following: wolf=noun, cabbage=noun, farmer=noun, boat=noun, river=noun, cross=verb, have to =verb(modal), can=verb(modal), not=negation, but= conjunction, just=adverb. The parts of speech of these words carry with them an implicit syntactic ordering. In deep parsing, this structure is stored with the text as shown in FIG. 8.

FIG. 9 depicts an example screen of display for a user interface for adding lexical information in accordance with an illustrative embodiment. FIG. 9 shows that each lexical entry is encoded with ontological facts. Screen of display 900 depicts a user interface illustrating a part of speech, order, class, etc. for the "goat" entity. As shown in the depicted example, "goat" is a noun of the order "herbivore" and the class "mammal." Each of the words can be stored in dictionaries that follow the theory of lexical semantics, basically that a great deal of information is stored in the lexicon of each word and this information informs other aspects of the grammar, including the syntax. In the above example, deep parsing discovers the following lexical semantics:

wolf:—mammal; carnivore; predator;
cabbage:—vegetable;
goat:—mammal; herbivore; prey;
farmer:—mammal; sentient; owner;
boat:—conveyance on water;
river:—obstacle; water; two banks.

Figure 10:
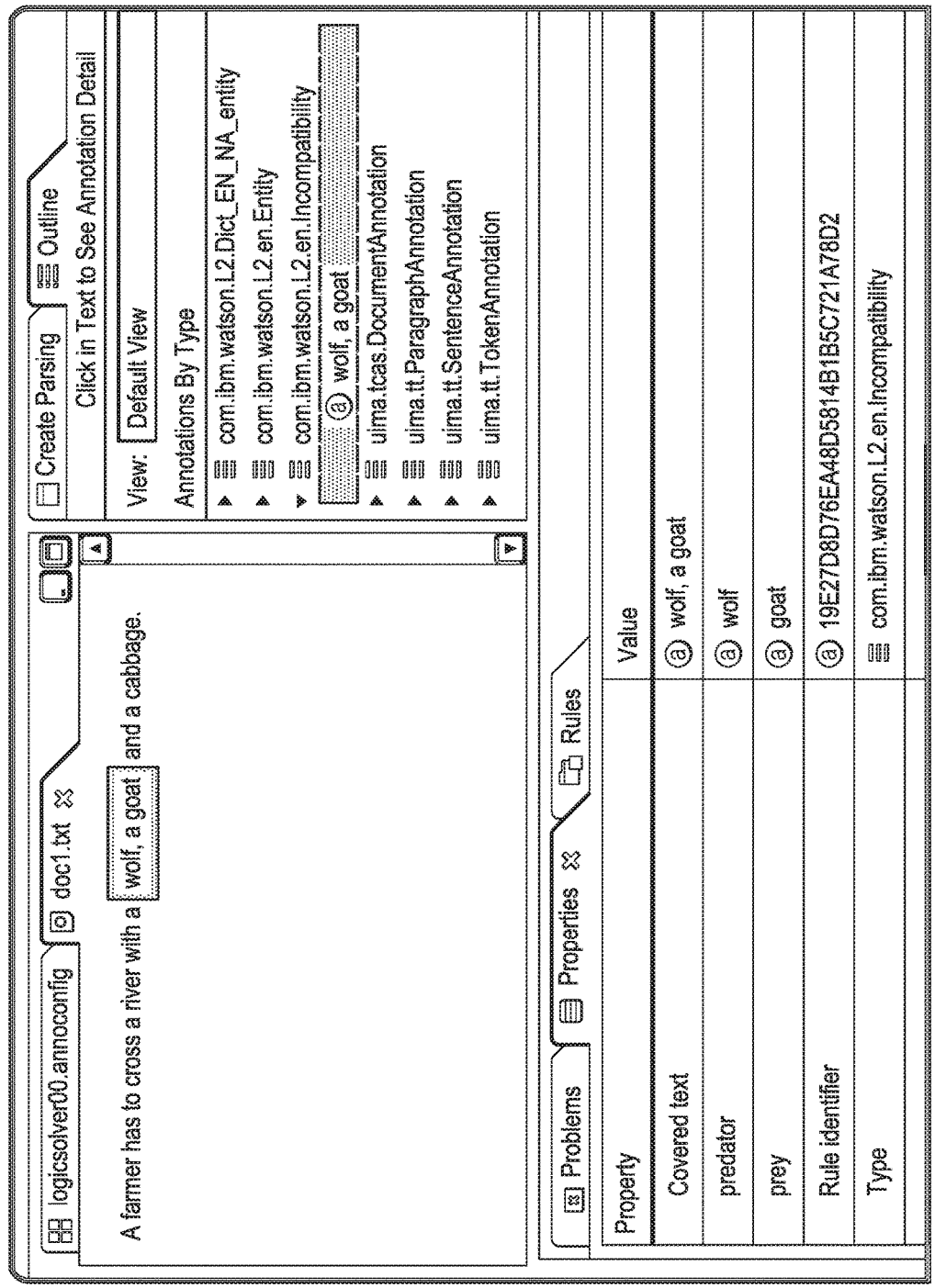
FIG. 10 depicts an example screen of display showing lexical semantics in accordance with an illustrative embodiment.

FIG. 10 depicts an example screen of display showing lexical semantics in accordance with an illustrative embodiment. FIG. 10 demonstrates the underlying linguistic system discovering an incompatibility, based on the ontological (in this case, phylogenic) encoded properties of the entities. As with the other example shown herein, FIG. 10 is intended only as an example. Lexical semantics provide a level of intuitiveness for solving logic problems. With the lexicon available, it is possible to explain the passage: "He cannot let the goat alone with the wolf or the goat with the cabbage. It is obvious why." In this example, solution engine 312 determines that a goat is an herbivore, which eats plants, and a cabbage is a plant. Solution engine 312 also determines that a wolf is a predator and a goat is prey. The lexical semantics provide clues for solving the logic puzzle.

Figure 11:
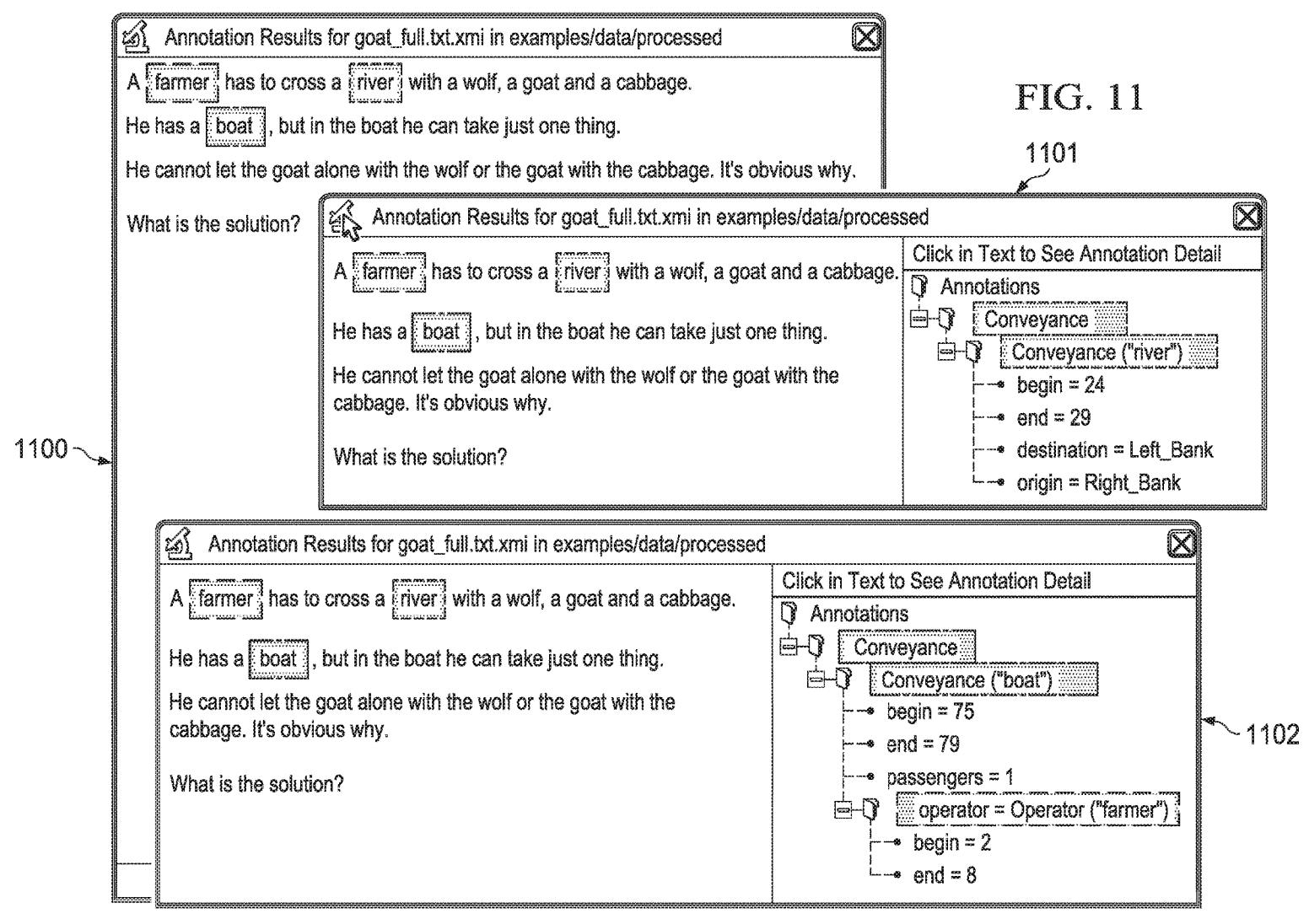

FIG. 11 depicts example screens of display for deepening linguistic output in accordance with an illustrative embodiment. Higher level lexical semantics also provide implicit knowledge and supply information not given in the text but critical to the solution. Screen of display 1100 identifies entities "farmer," "river," and "boat." Screen of display 1101 shows the lexical semantics annotations of "river" being a conveyance. Screen of display 1102 shows the lexical semantics annotations of "boat" being a conveyor and "farmer" being an operator of the conveyor.

Figure 12:
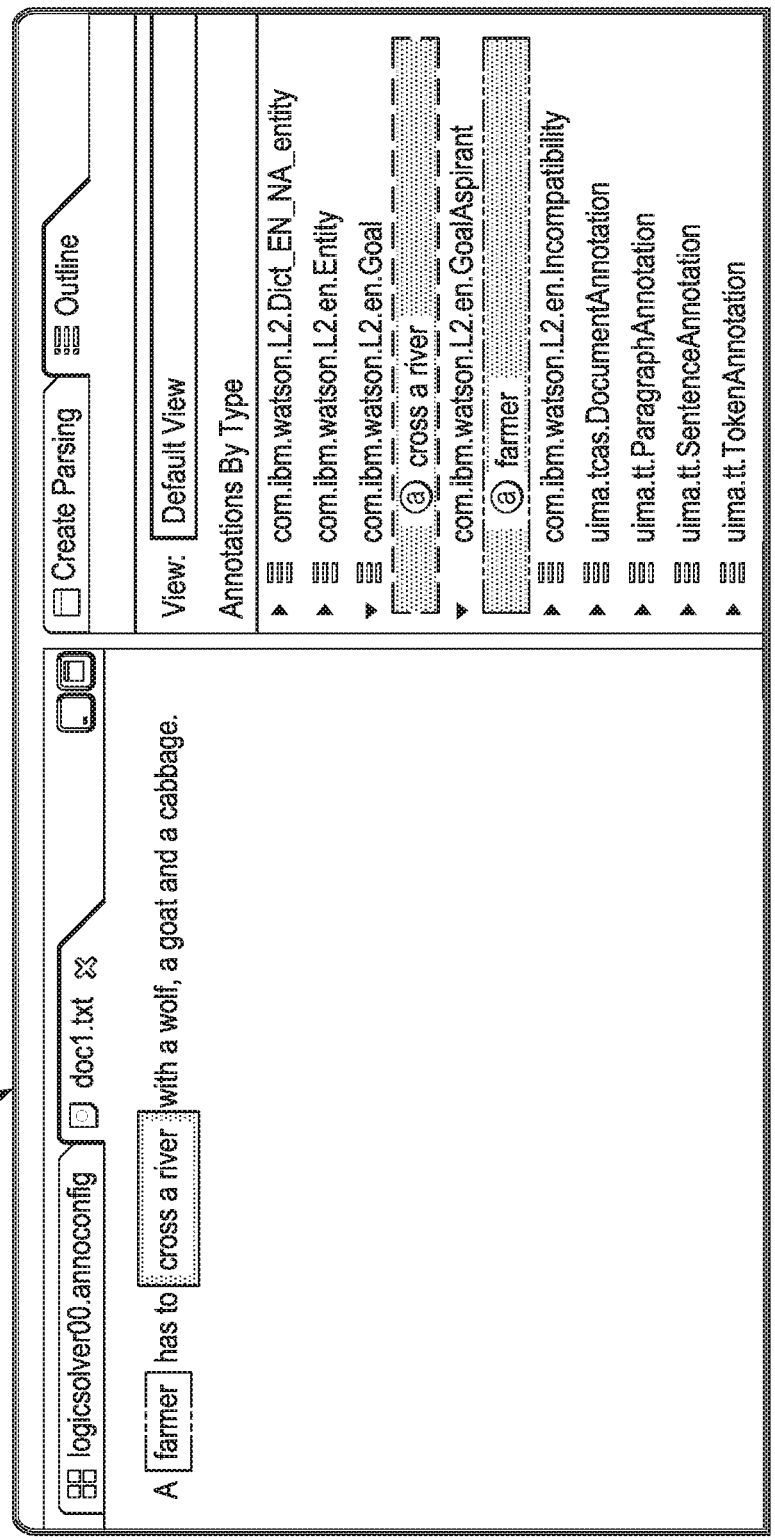
FIG. 12 depicts an example screen of display for theta roles in accordance with an illustrative embodiment.

FIG. 12 depicts an example screen of display for thematic (theta) roles in accordance with an illustrative embodiment.

Screen of display 1200 shows the theta role of the farmer crossing the river, which is critical to the solution to the logic puzzle.

Theta roles supply further logical relationships. The following is a list of major thematic relationships:

Agent: deliberately performs an action (e.g., *Bill* ate his soup quietly.).

Experiencer: the entity that receives sensory or emotional input (e.g., *Susan* heard the song. *I* cried.).

Theme: undergoes the action but does not change its state (e.g., I have *two children*. I put *the book* on the table.) (sometimes used interchangeable with patient).

Patient: undergoes the action and changes its state (e.g., The falling rocks crushed *the scissors*.).

Instrument: used to carry out the action (e.g., Jamie cut the ribbon *with a pair of scissors*.).

Force or Natural Cause: mindlessly performs the action (e.g., *An avalanche* destroyed the ancient temple.).

Location: where the action occurs (e.g., Johnny and Linda played carelessly *in the park*. I will be *at Julie's house* studying for my test.).

Direction or Goal: where the action is directed towards (e.g., The caravan continued on *toward the distant oasis*. He walked *to school*.).

Recipient: a special kind of goal associated with verbs expressing a change in ownership, possession. (e.g., I sent *John* the letter. He gave the book *to her*.).

Source or Origin: where the action originated (e.g., The rocket was launched *from Central Command*. She walked *away from him*.).

Time: the time at which the action occurs (e.g., The rocket was launched *yesterday*.).

Beneficiary: the entity for whose benefit the action occurs (e.g., I baked *Reggie* a cake. He built a car *for me*. I fight *for the king*.).

Manner: the way in which an action is carried out (e.g., *With great urgency*, Tabitha phoned 911.).

Purpose: the reason for which an action is performed (e.g., Tabitha phoned 911 right away *in order to get some help*.).

Cause: what caused the action to occur in the first place; not for what, rather because of what (e.g., *Because Clyde was hungry*, he ate the cake.).

The theta roles supply additional constraints on the entities, which in turn force the logical conclusion. For example, the farmer has the theta role of Agent—he is the only entity that can navigate the boat; the boat is an Instrument; the alternate river bank is the (implied) Goal; "in the boat" is a Location; etc.

FIGS. 11 and 12 are an illustration, for purposes of elucidation of the illustrative embodiments, of how NLP can be used to "create" implied relationships, which do not actually occur in text. This specifically draws on the example of the logic puzzle with the farmer who must cross the river: what is never stated in this example puzzle is that the human will supply the fact that a river (conveyor) has implicit origin and destination. A flaw in prior art machine solutions to this puzzle is that the intrinsic "world knowledge" is never acknowledged. The illustrative embodiments supply this knowledge through a rich lexicon.

Figure 13:
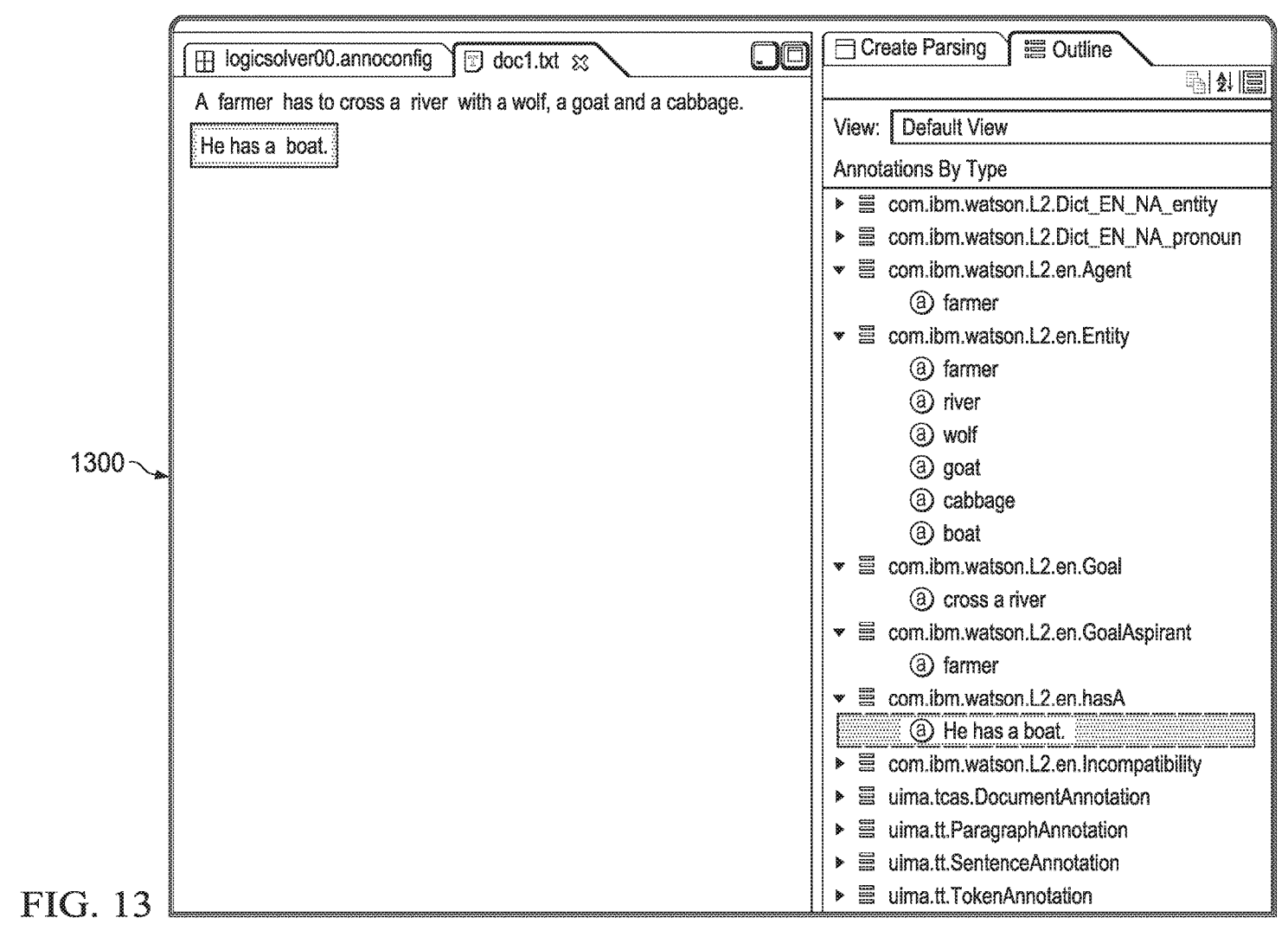

FIG. 13 depicts an example screen of display for object-oriented programming relationships in accordance with an illustrative embodiment. As seen in screen of display 1300, the relationships proposed after those implied by the semantics and thematic roles are derived from object-oriented programming (OOP). Thus, the sentence, "He has a boat," lends itself to the "hasA" OOP relationship.

As shown above, solution engine 312 uses syntax, lexical semantics, object-oriented programming relationships, and thematic roles, as well as statistical analysis and other techniques provided by cognitive processing components 320, as well as other reasoning algorithms, to generate data structures and ultimately candidate hypotheses for solving the logic problem. Solution engine 312 presents the coefficients for pairs of variables in an ordered fashion with higher coefficient values representing either close relationships or logical conundrums. The end user decides whether certain statistical pairs represent a close relationship or an anomaly. Solution engine 312 presents the entities within those texts in a fashion that either indicates a possible solution 302 or indicates that no solution is possible.

It is now possible for logic problem system 310 to solve a logic problem intuitively. That is, the output lexical semantics will contain sufficient information for the solution engine 312 to solve the problem parsimoniously and in a fashion similar to how a human would. While the benefits of this might not be apparent using the farmer/wolf/goat/cabbage example, the sample emergency room text described previously could not be solved using a directed graph or in Prolog. The mechanisms of the illustrative embodiments target the real-world "logic problems," such as diagnoses of illnesses, injury, as well as analysis of complex project plans, legal proceedings, police investigations, etc. All of these would benefit from the same type of logical scrutiny given to logic puzzles but would require the rich linguistic inputs to be at all useful.

In the above example logic puzzle, the solution engine 312 would derive from the linguistic input the following: 1) the goat cannot be alone with the cabbage; 2) the goat cannot be alone with the wolf; 3) the farmer may be with any other entity; 4) the farmer must be on one river bank at any given time; 5) the farmer must be with either of the combinations of wolf+goat or goat+cabbage; 6) only the wolf and the cabbage can be alone on a river bank; 7) there are two river banks, and the goal is the exchange of banks, respecting the constraints implied by 1 and 2 above. The only job of the solution engine 312 is to group the entities and banks in a list of possibilities. The solution engine 312 may then find the groupings as follows:

1) Bank1: farmer, goat, cabbage, wolf; Bank2: —;
2) Bank1: cabbage, wolf; Bank2: farmer, goat;
3) Bank1: farmer, cabbage, wolf; Bank2: goat;
4) Bank1: cabbage; Bank2: farmer, goat, wolf;
5) Bank1: farmer, goat, cabbage; Bank2: wolf
6) Bank1: goat; Bank2: farmer, cabbage, wolf;
7) Bank1: farmer, goat; Bank2: cabbage, wolf;
8) Bank1: —, Bank2: farmer, goat, cabbage, wolf.

Thus, solution engine 312 uses shallow and deep linguistic parsing, lexical analysis, theta role analysis, OOP relationship analysis, and statistical analysis to discover facts known about a logic problem. The solution engine 312 then maps facts to solutions to determine whether any discovered facts, statistical correlations, or statistical anomalies match the desired outcome.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 14:
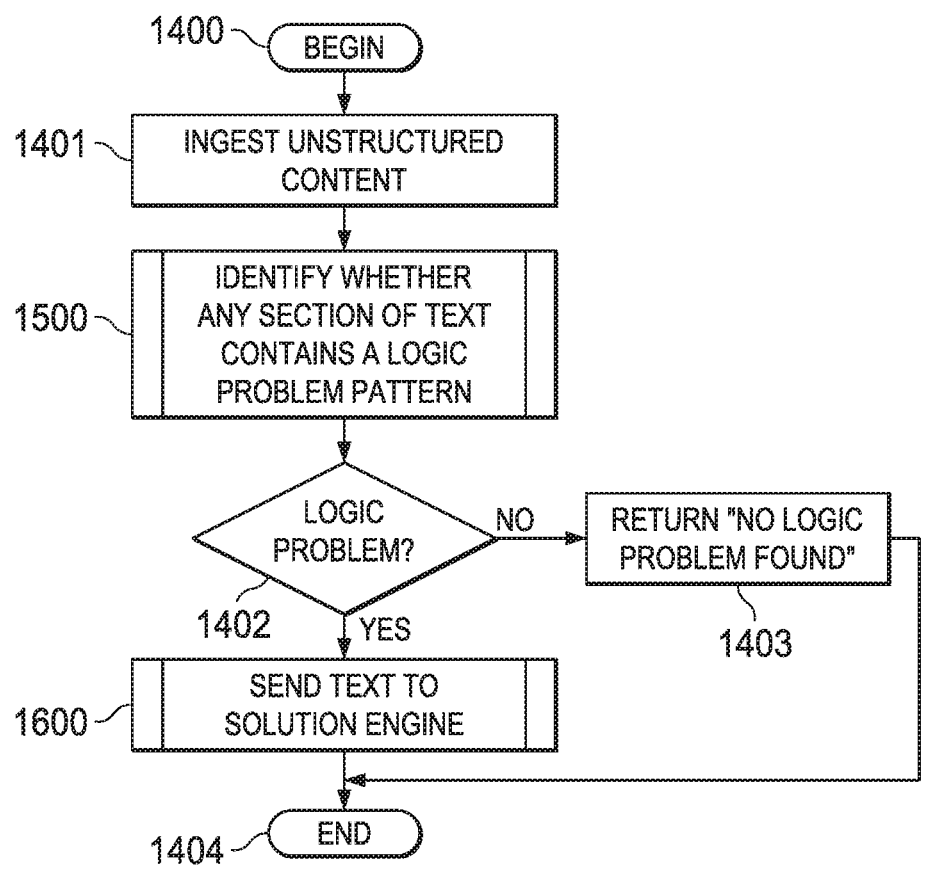
FIG. 14 is a flowchart illustrating operation of a detection engine for detecting a logic puzzle in accordance with an illustrative embodiment.

FIG. 14 is a flowchart illustrating operation of a detection engine for detecting a logic problem in accordance with an illustrative embodiment. Operation begins (block 1400), and the detection engine ingests unstructured content, such a textual input (block 1401). As described above, the textual input may be a document to be ingested into the corpus of information, a post in a social media service, or a text inputted by a user, for example. The detection engine then identifies whether any section of the text contains a logic puzzle pattern (block 1500). Operation of the detection engine for identifying whether a section of the text contains a logic problem pattern is described in further detail below with reference to FIG. 15.

The detection engine then determines whether a logic problem is detected (block 1402). If the detection engine does not detect a logic problem, then the detection engine returns a "no logic problem found" message (block 1403), and operation ends (block 1404).

If the detection engine does detect a logic problem in block 1402, then the detection engine sends the logic problem to a solution engine for generating one or more solutions (block 1600). Operation of the solution engine is described in further detail below with reference to FIG. 16. Thereafter, operation ends (block 1404).

Figure 15:
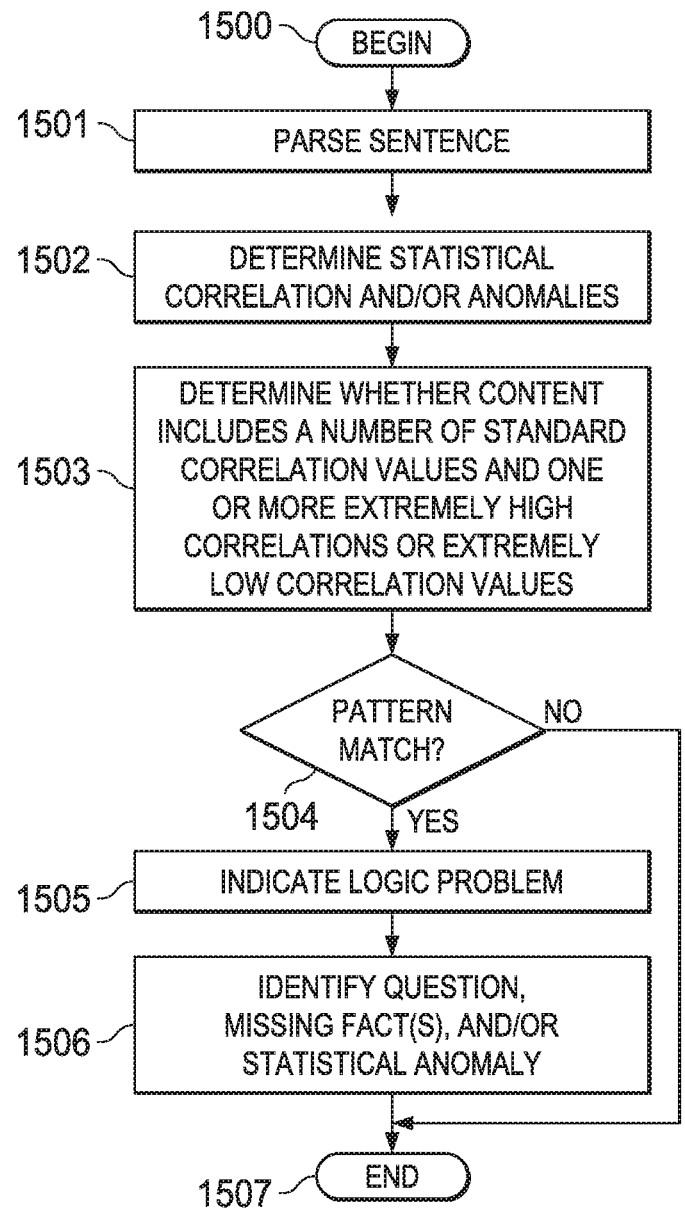
FIG. 15 is a flowchart illustrating operation of a detection engine for identifying whether a section of the text contains a logic puzzle pattern in accordance with an illustrative embodiment.

FIG. 15 is a flowchart illustrating operation of a detection engine for identifying whether a section of the text contains a logic problem pattern in accordance with an illustrative embodiment. Operation begins with a text, which is a portion or representation of the unstructured content (block 1500), and the detection engine parses the text (block 1501). As described above, parsing may include shallow parsing and deep linguistic parsing to detect entities (e.g., people, animals, locations, dates, or times) and explicitly stated relationships within the input text. The detection engine determines statistical correlations and/or anomalies in the text (block 1502). As described above, determining statistical correlations and/or anomalies may include performing analytics to determine statistical correlation values between entities found in the text through parsing. In an example embodiment, the detection engine uses a "ratio of densities" formula to calculate the statistical correlation values between entities, as described above with reference to FIG. 3. The detection engine determines whether the content includes a number of standard correlation values and one or more extremely high correlations or extremely low correlation values (block 1503).

In one embodiment, the detection engine applies the ratio of densities formula described above to statistical correlation values in the input text itself. That is, assuming a standard correlation value represents a fact, the detection engine applies the ratio of densities formula to determine a correlation values for the number of standard correlation values and the input text, where the domain is the overall corpus of documents or portions of text. Thus, the detection engine determines that a text with a high density of standard correlation values (facts) and one or more very high correlation values (anomaly) or very low correlation values (missing fact) may include a logic puzzle. The detection engine may determine whether the input text has a high density of standard deviation values and determine whether a given statistical correlation value is very high or very low by comparing each value to one or more thresholds.

The detection engine then determines whether the statistical correlation values determined for the text matches the pattern of a logic problem (block 1504). If the statistical correlation values match the pattern of a logic problem, then the detection engine presents an output that indicates the presence of a logic problem (block 1505). The detection identifies a question, missing fact(s), and/or statistical anomaly representing the goal of solving the logic problem (block 1506), and operation ends (block 1507). If the statistical correlation values do not match the pattern of a logic problem in block 1504, then operation ends (block 1507).

The text may explicitly state a question, or the missing fact or statistical anomaly may suggest the question. For example, consider the following simple example:

"There is a bird, a rabbit, and an eel. There are three habitats: a nest, a hutch, and a coral reef. The bird lives in the nest. The rabbit lives in the hutch."

In this example, the missing truth represented by a very low correlation between "eel" and any of the included habitats. Therefore, the detection engine may generate the question, "in what habitat does an eel live?" using slot filler templates, for example.

Figure 16:
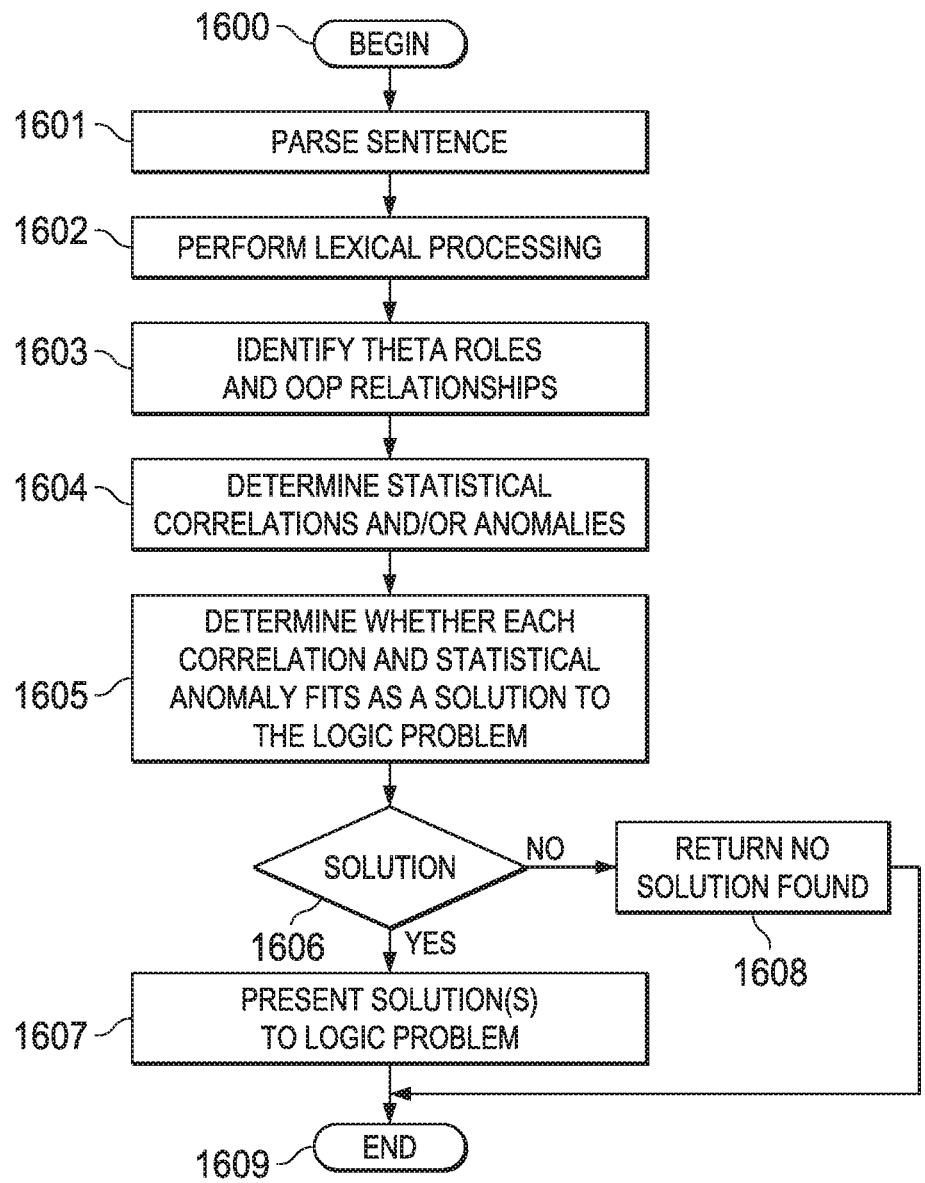
FIG. 16 is a flowchart illustrating operation of a solution engine for solving a logic puzzle in accordance with an illustrative embodiment.

FIG. 16 is a flowchart illustrating operation of a solution engine for solving a logic problem in accordance with an illustrative embodiment. Operation begins with a text, which is a portion or representation of the unstructured content (block 1600), and the solution engine parses the text (block 1601). As described above, parsing may include shallow parsing and deep linguistic parsing to detect entities (e.g., people, animals, locations, dates, or times) and explicitly stated relationships within the input text. The solution engine performs lexical processing (block 1602) and identifies theta roles and object oriented programming (OOP) relationships in the input text (block 1603).

The solution engine determines statistical correlations and/or anomalies in the text (block 1604). As described above, determining statistical correlations and/or anomalies may include performing analytics to determine statistical correlation values between entities found in the text through parsing. In an example embodiment, the detection engine uses a "ratio of densities" formula to calculate the statistical correlation values between entities, as described above with reference to FIG. 3. The solution engine determines whether each correlation, including statistical anomalies, fits as a solution to the logic problem (block 1605).

For example, consider the above example of the logic problem for determining a habitat for the eel. After performing lexical analysis and identifying theta roles and OOP relationships, "eel" and "hatch" will have a particular correlation value that fits as a solution to the logic problem. All other correlation values either do not suggest a solution (very low correlation value) or do not fit as a solution (are not related to "eel" or habitat).

The solution engine then determines whether one or more correlation values suggest a solution to the logic problem (block 1606). If a solution is found, then the solution engine presents the solution(s) to the logic problem (block 1607); otherwise, the solution engine returns an indication that no solution is found (block 1608). Thereafter, operation ends (block 1609).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The mechanisms of the illustrative embodiments detect and solve logic problems using natural language processing. The mechanisms fill in missing pieces of a set of facts and relationships. The mechanisms generate new solutions from new input instead of retrieving solutions from existing data. The mechanisms of the illustrative embodiments use a "ratio of densities" statistical formula to identify statistical anomalies. The mechanisms do not require a corpus of data to build up a knowledge base but can perform analysis on a single set of documents or a single document in real time. The mechanisms use lexical and relational linguistics as rich input to statistical analysis. The mechanisms have a built-in matrix and multi-edge user interfaces for visually finding statistical anomalies in the data. The mechanisms detect logic problems within a corpus of documents and solve the problems linguistically, using deep parsing and theta roles, rather than symbolically.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor and configure the processor to implement a logic problem system, comprising a logic problem detection engine and a logic problem solution engine, for identifying a logic problem to be solved, the method comprising:

parsing, by a parser executing on the at least one processor of the data processing system, the input text to identify entities in an input text received by the logic problem system by applying parser rules in a rules data structure;

determining, by a statistical analysis component executing on the at least one processor of the data processing system, statistical relationships between pairs of entities in the input text to form a set of statistical relationships;

determining, by logic problem detection engine executing on the at least one processor of the data processing system, whether the set of statistical relationships includes a high density of standard relationships and one or more outlier relationships;

responsive to determining that the set of statistical relationships includes a high density of standard relationships and one or more outlier relationships, presenting, by the logic problem detection engine, an indication that the input text includes a logic problem to a user;

identifying, by, the logic problem detection engine, a question, missing fact, or statistical anomaly in the input text representing a goal of solving the logic problem; and sending, by the logic problem detection engine to the logic problem solution engine, the input text, wherein the logic problem solution engine generates a plurality of candidate solutions to the logic problem ranked by confidence value.

2. The method of claim 1, wherein parsing the input text comprises performing shallow parsing and deep linguistic parsing on the input text to identify the entities.

3. The method of claim 1, wherein determining the statistical relationships comprises determining a statistical correlation value for each pair of entities in the input text.

4. The method of claim 3, wherein determining the statistical correlation value comprises calculating a ratio of densities for a given pair of entities.

5. The method of claim 4, wherein calculating the ratio of densities comprises applying the following formula:

$$\text{ratio of densities} = \frac{\#(A \cap B)/\#A}{\#B/\#D} = \frac{\#(A \cap B)/\#D}{(\#A/\#D)(\#B/\#D)},$$

where A is a first entity in the pair of entities, B is a second entity in the pair of entities, and D is a domain of all entities.

6. The method of claim 5, wherein determining whether the set of statistical relationships includes a high density of standard relationships comprises applying the ratio of densities formula to the set of correlation values and the input text with respect to a corpus of documents.

7. The method of claim 3, wherein determining whether the set of statistical relationships includes a high density of standard relationships and one or more outlier relationships comprises determining whether the set of statistical relationships includes a very high statistical correlation value representing a statistical anomaly.

8. The method of claim 3, wherein determining whether the set of statistical relationships includes a high density of standard relationships and one or more outlier relationships comprises determining whether the set of statistical relationships includes a very low statistical correlation value representing a missing fact in the input text.

9. A computer program product comprising a computer readable storage medium having a computer readable program stored therein, wherein the computer readable program, when executed on at least one processor of a data processing system, causes the data processing system to implement a logic problem system, comprising a logic problem detection engine and a logic problem solution engine, for identifying a logic problem to be solved, wherein the computer readable program causes the at least one processor to:

parse, by a parser executing on the at least one processor of the data processing system, the input text to identify entities in an input text received by the logic problem system by applying parser rules in a rules data structure;

determine, by a statistical analysis component executing on the at least one processor of the data processing system, statistical relationships between pairs of entities in the input text to form a set of statistical relationships;

determine, by a logic problem detection engine executing on the at least one processor of the data processing system, whether the set of statistical relationships includes a high density of standard relationships and one or more outlier relationships;

responsive to determining that the set of statistical relationships includes a high density of standard relationships and one or more outlier relationships, present, by the logic problem detection engine, an indication that the input text includes a logic problem to a user;

identify, by the logic problem detection engine, a question, missing fact, or statistical anomaly in the input text representing a goal of solving the logic problem; and send, by the logic problem detection engine to the logic problem solution engine, the input text, wherein the logic problem solution engine generates a plurality of candidate solutions to the logic problem ranked by confidence value.

10. The computer program product of claim 9, wherein parsing the input text comprises performing shallow parsing and deep linguistic parsing on the input text to identify the entities.

11. The computer program product of claim 9, wherein determining the statistical relationships comprises determining a statistical correlation value for each pair of entities in the input text.

12. The computer program product of claim 11, wherein determining the statistical correlation value comprises calculating a ratio of densities for a given pair of entities.

13. The computer program product of claim 12, wherein calculating the ratio of densities comprises applying the following formula:

$$\text{ratio of densities} = \frac{\#(A \cap B)/\#A}{\#B/\#D} = \frac{\#(A \cap B)/\#D}{(\#A/\#D)(\#B/\#D)},$$

where A is a first entity in the pair of entities, B is a second entity in the pair of entities, and D is a domain of all entities.

14. The computer program product of claim 13, wherein determining whether the set of statistical relationships includes a high density of standard relationships comprises applying the ratio of densities formula to the set of correlation values and the input text with respect to a corpus of documents.

15. The computer program product of claim 11, wherein determining whether the set of statistical relationships includes a high density of standard relationships and one or more outlier relationships comprises determining whether the set of statistical relationships includes a very high statistical correlation value representing a statistical anomaly.

16. The computer program product of claim 11, wherein determining whether the set of statistical relationships includes a high density of standard relationships and one or more outlier relationships comprises determining whether the set of statistical relationships includes a very low statistical correlation value representing a missing fact in the input text.

17. An apparatus comprising:
at least one processor; and
a memory coupled to the at least one processor, wherein the memory comprises instructions which, when executed by the at least one processor, cause the at least one processor to implement a logic problem system, comprising a logic problem detection engine and a logic problem solution engine, for identifying a logic problem to be solved, wherein the instructions cause the at least one processor to:

parse, by a parser executing on the at least one processor of the data processing system, the input text to identify entities in the input text;

determine, by a statistical analysis component executing on the at least one processor of the data processing system, statistical relationships between pairs of entities in the input text to form a set of statistical relationships;

determine, by the logic problem detection engine executing on the at least one processor of the data processing system, whether the set of statistical relationships includes a high density of standard relationships and one or more outlier relationships;

responsive to determining that the set of statistical relationships includes a high density of standard relationships and one or more outlier relationships, present, by the logic problem detection engine, an indication that the input text includes a logic problem to a user;

identify, by the logic problem detection engine, a question, missing fact, or statistical anomaly in the input text representing a goal of solving the logic problem; and send, by the logic problem detection engine to the logic problem solution engine, the input text, wherein the logic problem solution engine generates a plurality of candidate solutions to the logic problem ranked by confidence value.

18. The apparatus of claim 17, wherein determining the statistical relationships comprises determining a statistical correlation value for each pair of entities in the input text.

19. The apparatus of claim 18, wherein determining the statistical correlation value comprises calculating a ratio of densities for a given pair of entities.

20. The apparatus of claim 19, calculating the ratio of densities comprises applying the following formula:

$$\text{ratio of densities} = \frac{\#(A \cap B)/\#A}{\#B/\#D} = \frac{\#(A \cap B)/\#D}{(\#A/\#D)(\#B/\#D)},$$

where A is a first entity in the pair entities, B is a second entity in the pair of entities, and D is a domain of all entities.

21. The apparatus of claim 20, wherein determining whether the set of statistical relationships includes a high density of standard relationships comprises applying the ratio of densities formula to the set of correlation values and the input text with respect to a corpus of documents.

* * * * *